United States Patent [19]

Bisbing

[11] 4,128,923
[45] Dec. 12, 1978

[54] SNAP-IN RECEPTACLE ASSEMBLY FOR FASTENER

[75] Inventor: Robert H. Bisbing, Springfield, Pa.

[73] Assignee: Southco, Inc., Concordville, Pa.

[21] Appl. No.: 854,717

[22] Filed: Nov. 25, 1977

[51] Int. Cl.² ............................................. A44B 17/00
[52] U.S. Cl. ................................ 24/221 R; 24/221 A; 151/41.76; 85/5 P
[58] Field of Search ............ 24/221 A, 221 K, 221 R, 24/73 RM; 85/5 P; 151/41.76

[56] References Cited

U.S. PATENT DOCUMENTS

| | | | |
|---|---|---|---|
| 3,504,875 | 4/1970 | Johnson | 24/221 K |
| 3,874,041 | 4/1975 | Smith | 24/73 RM |

*Primary Examiner*—Bernard A. Gelak
*Attorney, Agent, or Firm*—Paul & Paul

[57] ABSTRACT

For detachably fastening inner and outer overlying plate members using a quarter-turn fastener, a square hole is punched in the inner panel and a snap-in receptacle assembly is inserted into the hole from the outer side of the panel and snapped into place. The receptacle assembly housing has six sides and is formed out of two components. The one component is a three-sided housing member having flange portions for bearing against the outer surface of the inner panel. The other component is a three-sided retainer member having spring legs which snap out behind the inner panel to lock the receptacle assembly in place. A compression spring inside the six-sided prism or housing has one end which bears against the front face of the retainer member and the other end bears against the fastener pressing it against rear face of the housing member and maintaining the housing and retainer members at spaced separation.

8 Claims, 5 Drawing Figures

SNAP-IN RECEPTACLE ASSEMBLY FOR FASTENER

BACKGROUND OF THE INVENTION

The present invention relates to fasteners, particularly fasteners for securing together two overlying plate members, typically an inner panel and an outer panel.

For fastening together such overlying plate members, the prior art has provided quarter-turn fasteners and receptacles in various designs. Many of these are designed to provide a quick-acting fastener for quick installation. The prior-art quarter-turn fastener have been provided in various head designs including oval head, wing head, flush head, knurled head, bail head, and notched head. Receptacles have likewise been provided in various designs, such as a clip-on receptacles, sealed receptacles, and spring-loaded press-in receptacles, of various types and designs.

SUMMARY OF THE INVENTION

A principal object of the present invention is to provide, for a quarter-turn fastener, or a fractional-turn fastener, or other fastener, a snap-in receptacle assembly for applications where installation of a receptacle by riveting, or welding, or bolting, or clipping in place, would be difficult and time consuming, if not impossible.

A further object is to provide, for a quarter-turn fastener, fractional-turn fastener, or other fastener, a receptacle assembly that is adapted for blind applications and for high production runs where speed of installation is important.

The foregoing objects, as well as other objects of the invention, are achieved by providing a receptacle assembly that simply snaps into place from one side of the job when it is inserted into a square hole punched in the frame or chassis.

DETAILED DESCRIPTION OF THE PREFERRED EMBODIMENTS

Figure 3:
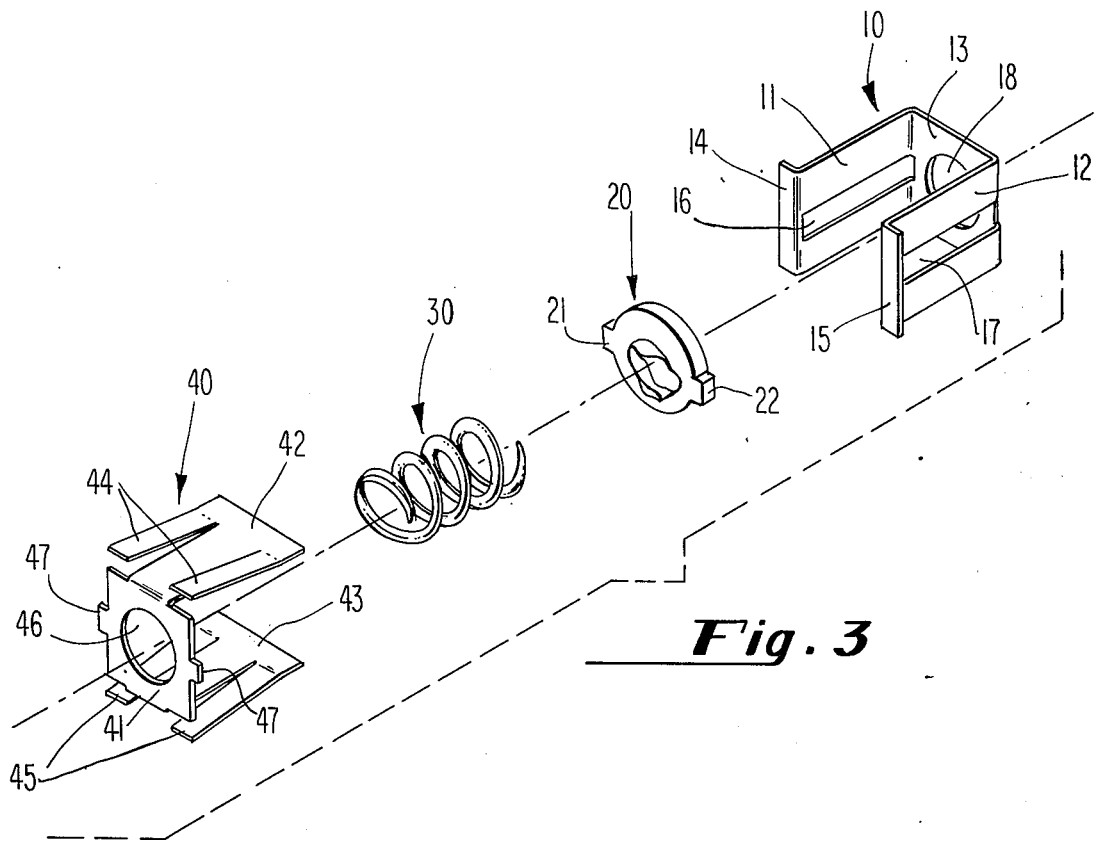
FIG. 3 is an exploded perspective view of the fastener assembly showing from left to right the retainer, the compression spring, the quarter-turn stud receptacle, and the housing member.

Referring first to FIG. 3 of the drawing, the snap-in receptacle assembly of the present invention has four components, a housing member 10, a stud socket or receptacle 20, a compression spring 30, and a retainer 40.

Figure 4:
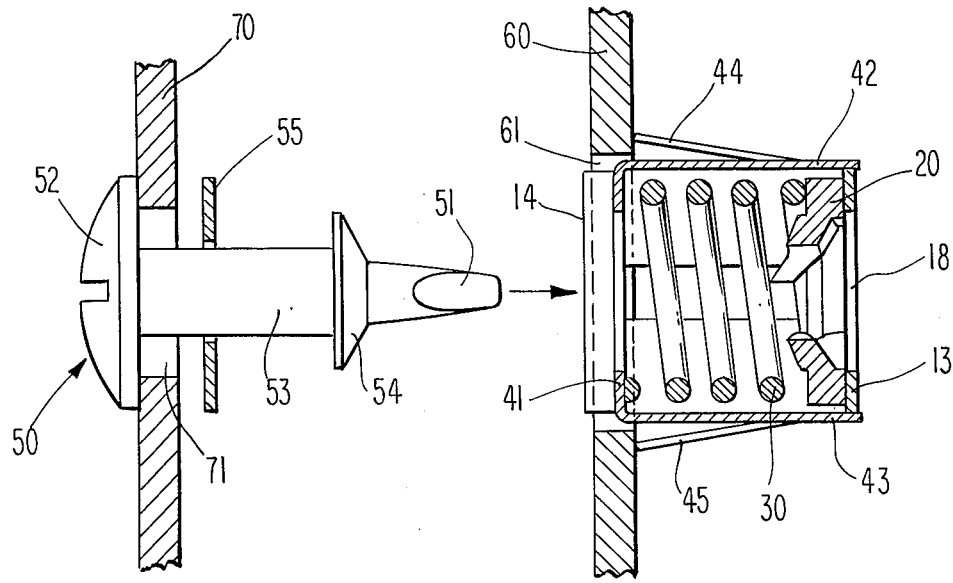
FIG. 4 is a view, in section, of the two panels showing the quarter-turn stud in the left-hand outer panel and the receptacle assembly snapped into place in the right-hand inner panel.
Figure 5:
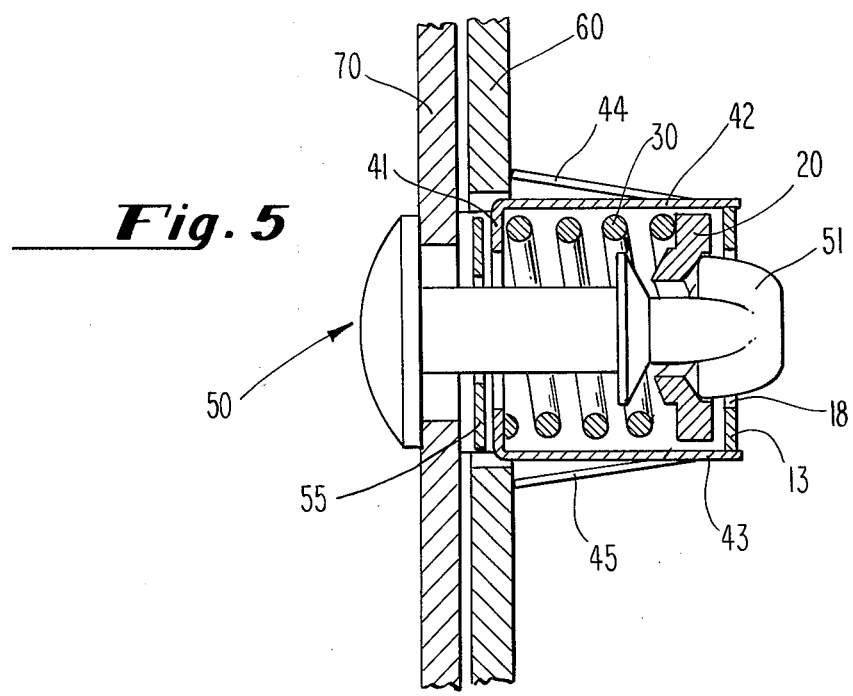
FIG. 5 is a view, in section, showing the quarter-turn stud inserted into the receptacle assembly.

The housing member 10 has two sidewalls 11,12 and a rear wall 13. The front edge portion of the sidewalls 11,12 are turned outwardly in opposing directions to form a pair of flanges 14,15 which are adapted to bear against the outer surface of an inner panel. The housing member 10 may conveniently be formed from flat material bent into a U-shape such that it has three segments 11,13,12 connected by two right-angle bends. In addition, as already indicated, the free end of each of the two side segments 11,12 are bent outwardly to form flange portions 14,15. The sidewalls 11,12 are provided with elongated slots 16,17 for receiving ears 21,22 of a generally circular socket or stud receptacle 20, and for receiving ears 47 of the forward wall of retainer member 40. The rear wall 13 of housing member 10 is provided with a central aperture 18 for receiving the nose 51 of the stud 50 (FIGS. 4 and 5).

The retainer 40 has a front wall 41, an upper wall 42, and a lower wall 43. The retainer 40, like housing member 10, may be formed from flat material into a U-shape such that its three segments 41,42, 43 are connected by two right-angle bends. The front wall 41 has a central aperture 46 and a pair of ears 47. The top and bottom walls 42,43 of the retainer 40 are slit to form pairs of outwardly-extending spring elements 44 and 45 which project from the upper wall and lower wall, respectively.

Figure 2:
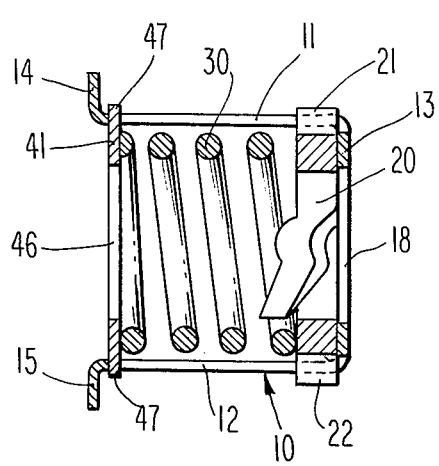
FIG. 2 is a half view, in section, taken along the line 2—2 of FIG. 1.
Figure 1:
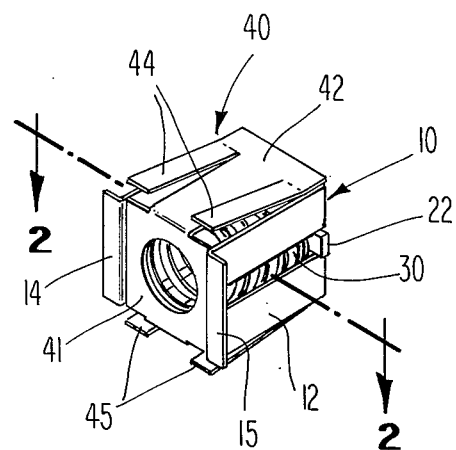
FIG. 1 is a perspective view of a six-sided snap-in receptacle assembly according to the present invention.

A compression spring 30 within the six-sided prism, formed when elements 10 and 40 are fitted together, maintains front wall 41 of retainer 40 and rear wall 13 of housing member 10 at spaced separation. One end of the compression spring 30 bears against the front wall 41 and the other end bears against the receptacle 20 which in turn bears against the rear wall 13 of the housing 10, as seen in section in FIG. 2.

The housing 10 and retainer 40 may preferably be stainless steel having a spring temper.

Use of the receptacle assembly is illustrated in FIGS. 4 and 5. The inner panel 60 is prepared by cutting a square hole 61 in the panel. The receptacle assembly is then inserted into the hole 61 until the flanges 14,15 seat against the outer surface of the inner panel 60. Inward pressure is then applied on the front wall 41 of the retainer 40 until both pairs of spring legs 44,45 snap out behind the panel 60, as illustrated in FIG. 4. The inward pressure referred to may be most conveniently applied by using a length of rod or dowel.

As seen in FIG. 4, a quarter-turn stud 50 is inserted through a hole 71 provided in outer panel 70. The hole 71 is, of course, smaller than head 52 of the stud. A split-ring retainer 55 is placed on the shank 53 between the head 52 and a flange 54.

The manner in which the outer panel 70 and inner panel 60 are secured together is illustrated in FIG. 5. In this figure, the quarter-turn stud 50 is shown inserted into the receptacle assembly with the tip or key end 51 of the stud 50 in locked position so that the stud 50, and the panel 70, are retained in the positions shown.

In the present application, the socket or receptacle 20 has been shown to be generally circular with a pair of laterally-extending ears 21,22 which engaged the slots 16,17 of the sidewalls of the housing member 10. The socket or receptacle 20 could, however, be of other shapes. It could, for example, be square with or without slot-engaging ears. Where the receptacle 20 is generally circular, the slot-engaging ears are, of course, necessary to prevent rotation of the receptacle 20 when the stud 50 is inserted therethrough and rotated. Where, however, the receptacle 20 is square or other shape which will not rotate within the prism when the stud 50 is turned, the ears 21,22 are unnecessary.

The snap-in receptacle assembly which has been described has a number of advantages. It fits a wide range of plate thicknesses without the looseness inherent in other snap-in devices; it is easily and quickly installed; and it can be used when only one side of the plate is accessible.

What is claimed is:

1. Fastening means for quickly detachably fastening together a pair of mutually overlying plate members, said fastening means including:
   A. a stud;
   B. a receptacle assembly, said receptacle assembly comprising:
      a. a housing member having two parallel side segments connected by a rearward segment, the free end of each of said side segment having an outwardly bent flange portion;
      b. a retainer member having two parallel side segments connected by a forward segment, said side segments having projecting therefrom outwardly extending spring elements; said housing and retainer members being placed in such relative assembled positions as to form a six-sided hollow rectangular prism;
      c. stud-engaging means within said prism;
      d. a spring member within said prism having its forward end bearing against said forward segment of said retainer member and its rearward end applying thrust against said rearward segment of said housing member for urging said forward and rearward segments of said retainer and housing members away from each other.

2. Fastening means according to claim 1 wherein said stud engaging means comprises a socket receptacle disposed in said prism between said rearward segment of said housing member and the rearward end of said spring member.

3. Fastening means according to claim 2 wherein said forward segment of said retainer member and said rearward segment of said housing member are each provided with a centrally located aperture for passage of said stud.

4. Fastening means according to claim 2 wherein said housing member is formed from flat material bent into a U-shape such that its rearward segment is an intermediate segment between two parallel side segments and connected thereto by two right-angle bends.

5. Fastening means according to claim 2 wherein said retainer member is formed from flat material bent into a U-shape such that its forward segment is an intermediate segment between two parallel side segments and connected thereto by two right-angle bends.

6. Fastening means according to claim 2 wherein said outwardly extending spring elements which project from the side segments of said retainer member are formed by sliting portions of said side segments and bending said slit portions outwardly, said spring elements being adapted to pass through a hole cut in one of said plate members and to snap out behind the rearward surface of said plate member.

7. Fastening means according to claim 2 wherein:
   a. said socket receptacle is generally circular in shape and is provided with laterally-extending ears, and
   b. said side segments of said housing member are provided with slots for receiving said ears of said socket receptacle for preventing rotation of said receptacle when said stud is turned.

8. Fastening means according to claim 7 wherein said forward segment of said retainer member is provided with retaining ears which are received with the slots of said side segments of said housing member.

* * * * *